(12) United States Patent
Sayman et al.

(10) Patent No.: US 6,641,505 B2
(45) Date of Patent: Nov. 4, 2003

(54) METHOD OF PREVENTING ENGINE STALL USING AUTOMATED CLUTCH CONTROL

(75) Inventors: Robert Anthony Sayman, Eriskirch (DE); Rupert Kramer, Friedrichshafen (DE); Mario Steinborn, Friedrichshafen (DE); James Henry DeVore, Laurinburg, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 10/060,426

(22) Filed: Jan. 30, 2002

(65) Prior Publication Data

US 2003/0144114 A1 Jul. 31, 2003

(51) Int. Cl.⁷ .............................................. B60K 41/02
(52) U.S. Cl. ...................................................... 477/177
(58) Field of Search ................................ 477/171, 175, 477/177

(56) References Cited

U.S. PATENT DOCUMENTS

| | | | |
|---|---|---|---|
| 4,263,997 A | | 4/1981 | Poore |
| 4,688,665 A | | 8/1987 | Rowen |
| 4,732,248 A | * | 3/1988 | Yoshimura et al. .......... 477/177 |
| 5,277,286 A | * | 1/1994 | Yamamoto et al. .......... 477/177 |
| 5,314,050 A | | 5/1994 | Slicker et al. |
| 5,316,116 A | | 5/1994 | Slicker et al. |
| 5,378,211 A | | 1/1995 | Slicker et al. |
| 5,489,012 A | * | 2/1996 | Buckley et al. .............. 477/171 |
| 5,630,773 A | * | 5/1997 | Slicker et al. ............... 477/176 |

* cited by examiner

Primary Examiner—Dirk Wright
(74) Attorney, Agent, or Firm—Carlson, Gaskey & Olds

(57) ABSTRACT

A system and method of controlling an automatic clutch to prevent a motor vehicle engine from stalling is disclosed. The method includes the steps of determining an engine stall threshold, detecting accelerator pedal actuation, detecting current engine speed, and comparing current engine speed to the engine stall threshold. If the engine speed is below the engine stall threshold, a controller detects and compares vehicle acceleration to predetermined threshold acceleration such that the automatic clutch is actuated only when the vehicle acceleration is below the threshold acceleration. The system includes the step of detecting foot brake position such that the automatic clutch is only actuated if the foot brake is properly actuated. The controller will then actuate the automatic clutch to proportionally decouple the engine from the transmission to prevent engine stall. The automatic clutch will remain open until detecting a predetermined clearing condition.

14 Claims, 6 Drawing Sheets

METHOD OF PREVENTING ENGINE STALL USING AUTOMATED CLUTCH CONTROL

BACKGROUND OF THE INVENTION

This invention relates generally to a method of controlling an automated clutch to prevent engine stall in a motor vehicle equipped with an automated clutch.

There is a current and growing interest to increasingly automate the function of a motor vehicle driveline in an effort to increase efficiency in operation. This need for efficient use of engine power during all conditions is of increasing interest to manufacturers and consumers of large trucks.

It is known to use an automated clutch system that actuates a clutch in the same manner as a manual clutch. Typically, an automated clutch system includes a clutch selectively engaged to a flywheel to transmit power from the motor to the transmission, and a control system to actuate the clutch. The automated clutch system includes a friction disk that selectively engages a flywheel driven by the engine. An automated clutch system duplicates the actions of a skilled and experienced operator to optimize operation, such as gear changes, of the motor vehicle.

A motor vehicle equipped with an automated clutch system does not include a clutch pedal for manual actuation of the clutch; instead, a controller controls actuation of the clutch to facilitate gear changes. As appreciated, there are other instances beside gear changes that require disengagement of the clutch from the flywheel. The controller is therefore programmed to disengage the clutch during other conditions. One of these conditions is during coasting of the motor vehicle. Coasting defines a condition when the motor vehicle is moving and the throttle pedal is not engaged, such as when approaching a stop light or slowing for traffic. Typically, when a coasting condition is detected, the controller will proportionally open the clutch to prevent the engine from stalling and provide a smooth transition to a slower speed. However, if an operator is engaging the accelerator the controller will not detect that the motor vehicle is coasting to open the clutch. Therefore, the control does not open the clutch in situations such as panic stops where an operator may be pressing both the accelerator and the brake pedal.

Further, large trucks typically includes engines of such power that they can drive through the brakes. In other words, the engine can overpower the brakes and result in continued movement when the need is to stop quickly, or can result in the engine stalling.

Another condition causing stalling of the engine includes an unexpected stop, for instance when approaching a traffic light that unexpectently changes sooner than anticipated. As appreciated, the motor vehicle with an automated clutch would typically detect a coasting condition and proportionally open the clutch to account for slowing of the vehicle. However, in some instances, an inexperienced operator may rest a foot on the throttle pedal to exert sufficient pressure such that a coasting condition is not detected and the clutch will remain closed, causing undesirable engine stall.

Large truck manufacturers and fleet operators are constantly seeking ways to improve efficiency and reduce costs. Operating a large truck at or near engine stall conditions places great stress on the motor vehicle and in some instances can cause damage to the engine. Increased stress on the engine can increase maintenance and operating costs of the motor vehicle.

Such automated clutches utilized in automatic transmissions and in so-called assisted manual type transmissions wherein part of the manual shifting process is assisted by automated controllers, such as an automated clutch. The present invention would have benefits in automated clutches utilized with either type transmission.

For these reasons, it is desirable to design an automated clutch control system that opens the clutch in response to potential stall conditions with the throttle pedal actuated.

SUMMARY OF THE INVENTION

An embodiment of this invention is a system and method of controlling an automated clutch system to prevent engine stall by detection of motor vehicle conditions indicative of engine stall.

The automated clutch system for a motor vehicle includes an engine coupled to a transmission by way of an automated clutch. The automated clutch includes a friction element for selective coupling to a flywheel driven by an engine output shaft. The automated clutch actuates to open the connection between the engine and transmission to facilitate gear changes. A disclosed controller operates the automated clutch in either a manual or automatic mode. In the manual mode, the controller actuates the automated clutch in response to operator input through the gearshift lever, much like normal operation of a manually shifted transmission. Alternatively, the controller can operate the automated clutch in concert with the transmission to automatically shift gears in response to specific engine speed and vehicle acceleration conditions. The specifically disclosed controller is utilized in one type of transmission which combines both the assisted manual shifting and the automatic shifting options as described above. However, then again as mentioned above, this invention would cover not only this disclosed embodiment, but also either of the separate transmission types.

The controller accommodates coasting by opening the clutch in proportion to the speed of the vehicle. The proportional opening of the clutch reduces the amount of contact between the friction plate and the flywheel to allow a predetermined amount of slipping. Coasting is a condition where there is no accelerator pedal input, but the vehicle is still moving, such as slowing for a traffic light or for slower vehicles. The controller detects a coasting condition only in the absence of accelerator pedal input, therefore, if an inexperienced operator errantly rests his foot on the accelerator pedal, the controller will not detect a coasting condition to open the clutch. Further, during a panic stop where an operator actuates both the brake and the accelerator the clutch will not open. This invention is a method of detecting conditions indicative of engine stall and proportionally opening the automatic clutch in response to engine stall conditions even when the accelerator pedal is actuated.

The method includes the initial step of determining an engine stall threshold relative to current operating conditions of the motor vehicle. The engine stall threshold includes correction factors for vehicle acceleration and for the time at a predetermined engine speed. The engine speed threshold value is the engine speed at which the clutch will open proportionally to prevent the engine from stalling. An engine speed below the engine speed threshold value will prompt a check by the controller of vehicle acceleration. If the vehicle is accelerating sufficiently to prevent engine stall, even at lower engine speeds, the controller will not open the clutch.

Once it is determined that current engine speed is below the engine speed threshold, and motor vehicle acceleration is below a predetermined threshold, the controller will actuate the clutch to selectively couple the engine and transmission to prevent engine stall.

An on/off check is included in the system to allow inclusion of the stall prevention control within the much larger clutch control system such that the stall prevention control portion can be selectively engaged according to the specific configuration of the motor vehicle.

Additionally, a check for engagement of the foot brake before actuating the automatic clutch is conducted. Engagement of the foot brake is a requirement for the controller to actuate the clutch in one embodiment of this method. Another embodiment of this method does not require actuation of the foot brake to allow the clutch to open.

The controller maintains proportional clutch opening until a clearing condition is detected. The clearing conditions are conditions of the vehicle that indicate that engine stall should be allowed, or that engine stall has been prevented by actions other than engine stall control. The controller continues to proportionally open the clutch until one of the clearing conditions is detected so that the controller resumes normal operation of the automatic clutch.

The automated clutch control system of this invention detects stall conditions and properly actuates the clutch to prevent the engine from stalling to simplify the operation of a motor vehicle equipped with an automated clutch.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
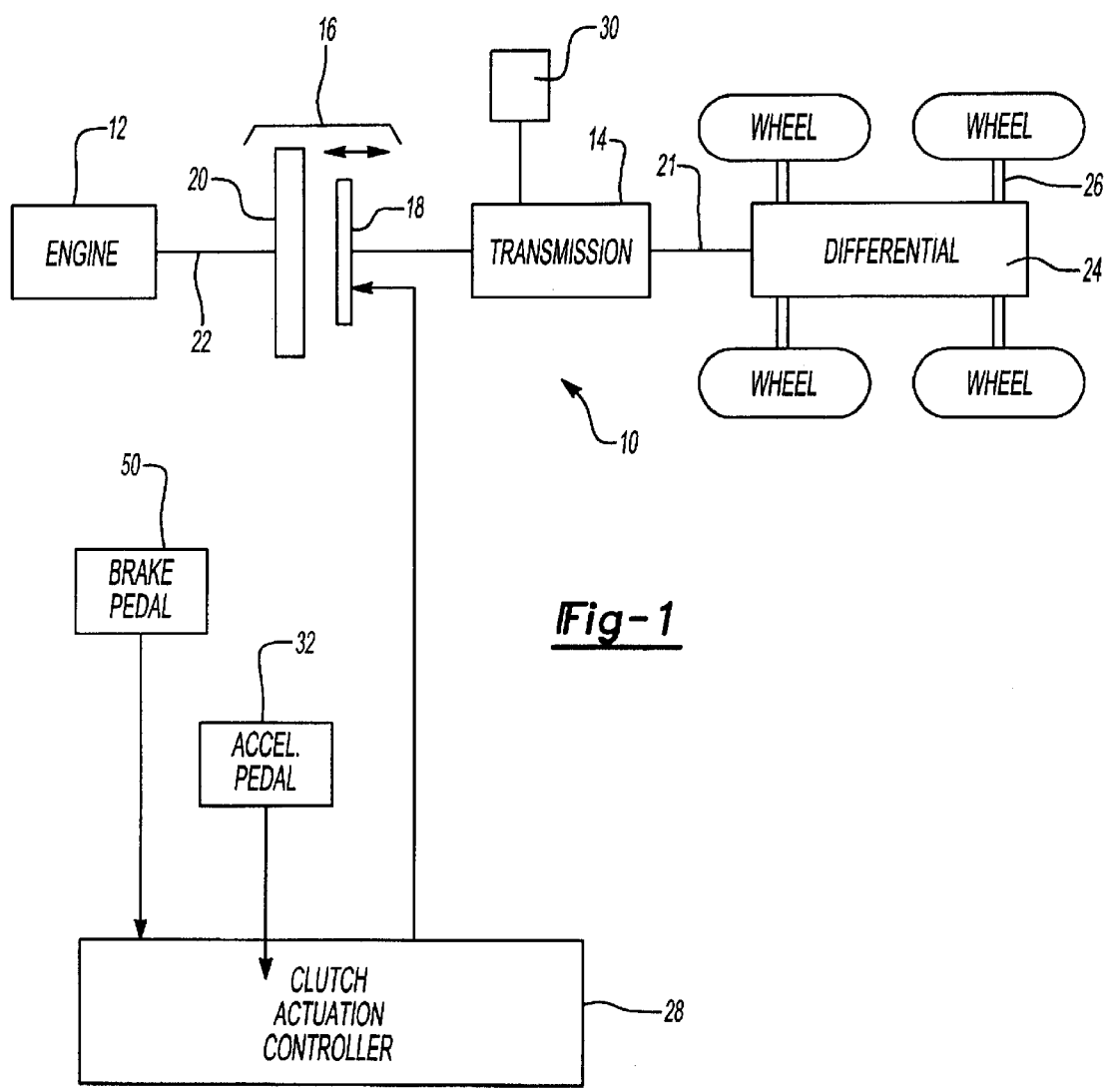
FIG. 1 is a schematic representation of a motor vehicle including an automatic clutch.

An automated clutch system for a motor vehicle 10 is schematically shown in FIG. 1 and includes an engine 12 coupled to a transmission 14 by way of an automated clutch 16. The automated clutch 16 may be generally as known by one skilled in the art, and includes a friction element 18 for selective coupling to a flywheel 20 driven by an engine output shaft 22. The automated clutch 16 actuates to decouple the connection between the engine 12 and transmission 14 to facilitate gear changes. The transmission 14 includes a plurality of selectable gears to vary the speed of an output shaft 21. The output shaft 21 from the transmission 14 drives the vehicle 10 such as through a differential 24 and a drive axle 26.

The disclosed controller 28 may operate the automated clutch 16 and transmission 14 in either a manual or automatic mode. In the manual mode, the controller 28 actuates the automated clutch 16 in response to operator input through the gearshift lever 30, much like normal operation of a manually shifted transmission. The controller 28 actuates the automated clutch 16 to decouple the friction element 18 from the flywheel 20 to facilitate the gear change initiated by the operator and closes the clutch 16 upon completion of the gear change.

Alternatively, the controller 28 can operate the automated clutch 16 in concert with the transmission 14 to automatically shift gears in response to specific engine speed and vehicle acceleration conditions. The operator in this mode simply depresses an accelerator pedal 32 and the automatic clutch 16 opens and closes as required to facilitate acceleration of the motor vehicle 10. The description of the operation of the automated clutch 16 is illustrative, and it will become apparent to one knowledgeable in the art that these and other methods of actuating an automated clutch system for shifting are within the contemplation of this invention.

The known controller 28 accommodates coasting by opening the clutch 16 in proportion to the speed of the vehicle 10. The proportional opening of the clutch 16 reduces the amount of contact between the friction plate 18 and the flywheel 20 to allow a predetermined amount of slipping. The amount of slipping between the friction plate 18 and flywheel 20 will vary depending on the speed of the motor vehicle 10. As appreciated, the slower the vehicle 10 is moving the more open the clutch 16 should be. In other words, the friction plate 18 will move towards a fully open position as the vehicle 10 slows, and towards a fully closed position as the vehicle 10 increases speed.

Coasting is a condition where there is no accelerator pedal 32 input, but the vehicle 10 is still moving, such as slowing for a traffic light or for traffic. The controller 28 detects a coasting condition only in the absence of accelerator pedal 32 input, therefore, if an inexperienced operator errantly rests his foot on the accelerator pedal 32, the controller 28 will not detect a coasting condition to open the clutch 16. Further, during a panic stop where an operator actuates both the brake 50 and the accelerator 32 the clutch 16 will not open. As appreciated, large trucks include engines capable of such power that it is possible to drive through the brakes when the clutch 16 is closed by actuation of both the accelerator 32 and brake 50. Further, actuation of both the accelerator 32 and brake 50 can also result in stalling of the engine 12. This invention is a method and controller capable of detecting conditions indicative of engine stall and proportionally opening the automatic clutch 16 in response to engine stall conditions where the accelerator pedal 32 is actuated.

Figure 2:
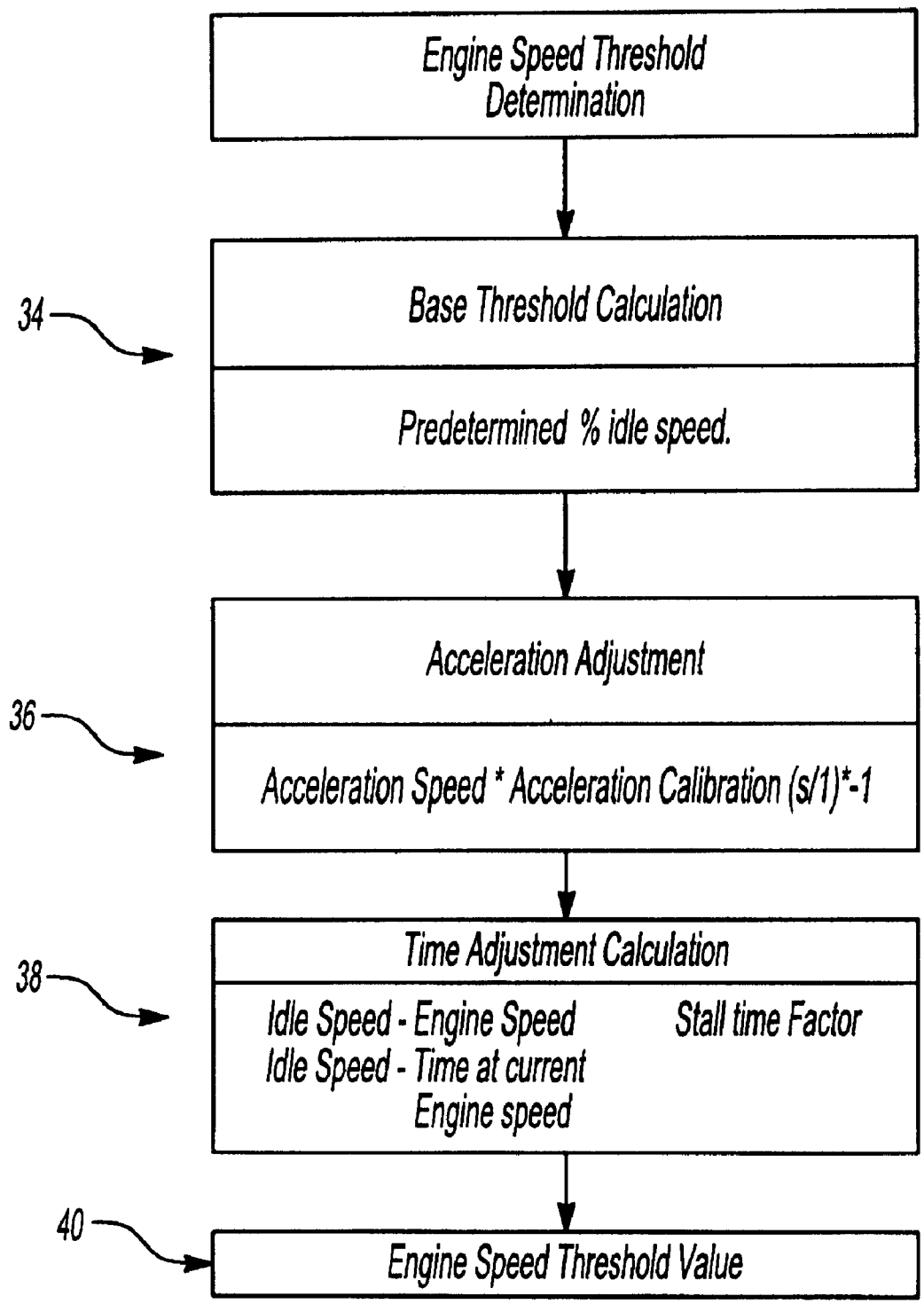
FIG. 2 is a block diagram of the determination of engine speed indicative of engine stall.

Referring to the flow chart of FIG. 2, the method includes the initial step of determining an engine stall threshold relative to current operating conditions of the motor vehicle 10. Determination of engine stall threshold includes the step indicated at 34 of providing a base threshold engine speed. The base threshold engine speed 34 is determined as a percentage of normal engine idle speed. In one preferred embodiment, the base threshold engine speed is approximately 90 percent of normal engine idle speed. The normal engine idle speed will vary from vehicle to vehicle and a worker skilled in the art would understand that engine idle speed will also vary depending on current operating conditions of the motor vehicle.

An adjustment is made to the base threshold calculation 34 according to an acceleration adjustment, indicated at 36, that accounts for the acceleration or deceleration of the motor vehicle 10. Rapid deceleration of the motor vehicle 10 will overshoot the base engine speed threshold 34 to stall the engine 12 before the clutch 16 can be opened unless accounted for by the acceleration adjustment 36. Conversely, during a rapid acceleration condition an unadjusted engine speed threshold value will cause the clutch 16 to open unnecessarily. In other words, rapid acceleration of engine speed indicates a recovery from engine stall conditions toward normal conditions, and therefore does not require opening of the clutch 16 to prevent engine stalling. The acceleration adjustment therefore biases the base engine speed threshold in response to changes in engine speed, i.e. lower for accelerating conditions, and higher for deceleration conditions. The result of the acceleration adjustment in response to current engine conditions is that the clutch 16 opens at a lower engine speed for an accelerating engine, and opens at a higher engine speed for a decelerating engine.

A time adjustment, indicated at 38, increases the engine stall threshold in response to increasing time below engine idle speed. The time adjustment increases the engine stall threshold value as the duration of time below engine idle increases to cause clutch 16 actuation. As appreciated, an engine speed that is below idle and just above the engine stall threshold is not desirable, therefore as the duration of time below engine idle speed increases so does the engine stall threshold value such that the clutch 16 will open proportionally to accommodate the low engine speed. The time adjustment 38 considers the engine idle speed, current engine speed and the duration at current engine idle speed. These factors in concert with a stall time factor progressively increase the engine speed at which the clutch 16 is opened in response to the duration of time below engine idle speed.

Figure 3:
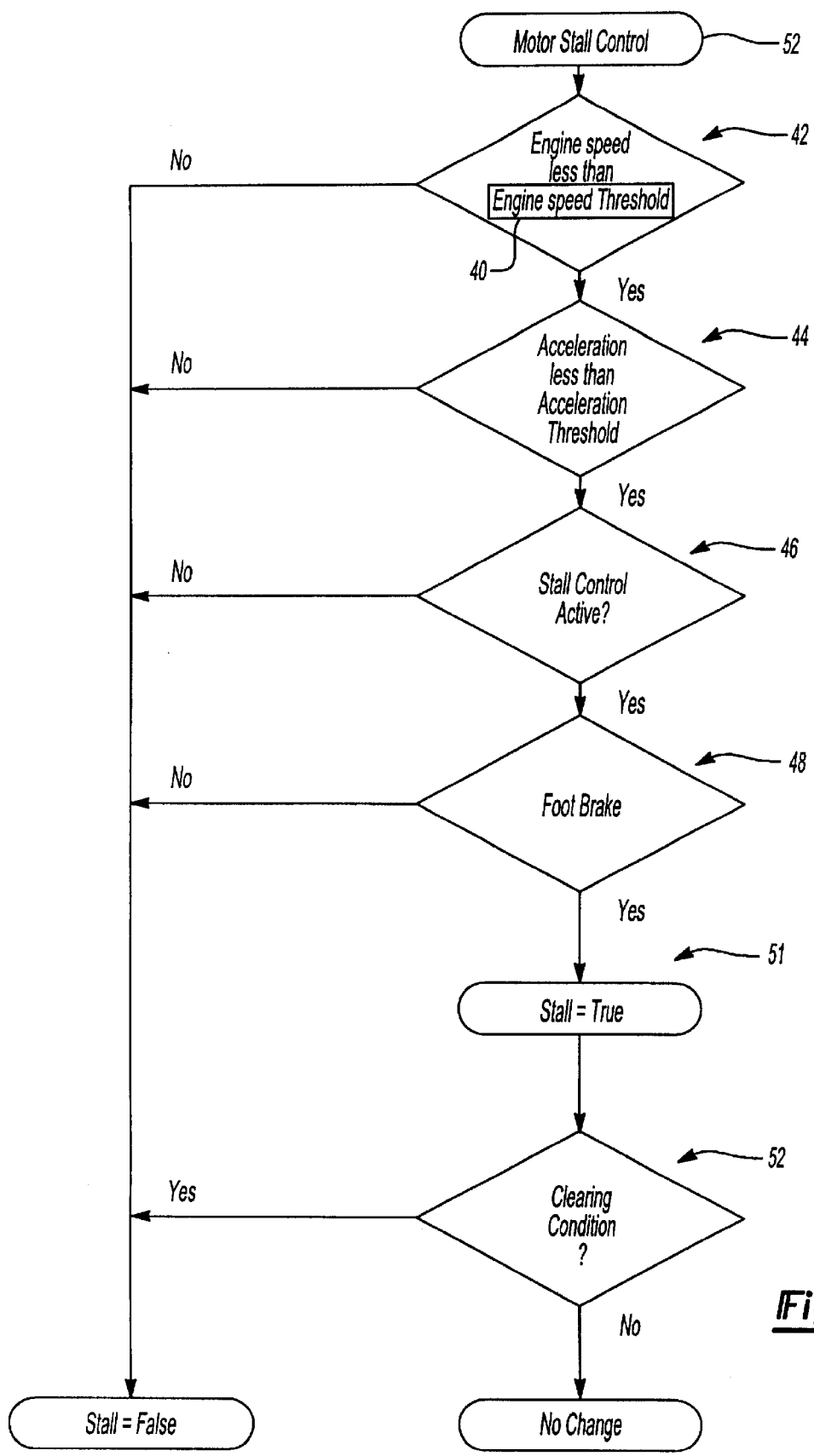
FIG. 3 is a flow chart of a method of controlling an automated clutch.

The engine speed threshold value 40 continually updates in response to changes in engine speed, acceleration and motor vehicle conditions. As appreciated, the engine speed threshold value 40 is the engine speed at which the clutch 16 will open proportionally to prevent the engine 12 from stalling. Referring to FIG. 3, the engine speed threshold value 40 is compared to the current engine speed as indicated at 42. An engine speed below the engine speed threshold value 40 will prompt the controller 28 to measure the magnitude and direction of any change in engine speed. In other words, if the current engine speed is below the engine speed threshold 40, the controller 28 detects the acceleration of the vehicle 10.

The current acceleration of the motor vehicle 10 is compared to an acceleration threshold value indicated at 44. The acceleration threshold value 44 prevents opening of the clutch 16 during rapid increases in engine speed indicative of a recovery from stall conditions. As appreciated, the acceleration threshold value is much like the acceleration adjustment value 36 shown in FIG. 2, in that both account for changes in engine speed. However, the acceleration threshold value 44 prevents actuation of the clutch 16 during acceleration, and does not vary in response to engine conditions. The acceleration threshold value 44 is a predetermined value selected relative to the configuration of the motor vehicle 10. Preferably, the predetermined acceleration threshold 44 is zero to indicate that the motor vehicle 10 is either stopped or decelerating.

Once it is determined that current engine speed is below the engine speed threshold 40, and motor vehicle acceleration is below the acceleration threshold value, the controller 28 will actuate the clutch 16 to selectively decouple the engine 12 and transmission 14 to prevent engine stall. Selective coupling of the clutch 16 is accomplished by allowing an amount of slippage between the friction disk 18 and flywheel 20.

There is included an on/off check, indicated at 46, before the clutch 16 is actuated. The specific steps and checks taken by the controller upon detection of an engine stall condition are only a part of the entire clutch control system, and as such an on/off value allows for the stall control method of this invention to be installed as a standard part of the larger control system and turned on and off as specific motor vehicle configurations require. A worker knowledgeable in the art will understand that such on/off conditions allow this system to be easily and efficiently adapted to a wide range of differently configured motor vehicles.

The system includes a check for engagement of the foot brake 50 as indicated at 48 before actuating the automatic clutch 16. Engagement of the foot brake 50 is a requirement for the controller to actuate the clutch 16 in one embodiment of this method. As appreciated, this method allows for variation as to the specific configuration of the motor vehicle in which the automated clutch is installed. In the embodiment illustrated in FIG. 3, actuation of the foot brake 50 is required to allow the clutch 16 to open. Reasons for not opening the clutch unless the foot brake 50 is actuated include the desire to ensure that the operator is in control of the motor vehicle 10 before the clutch 16 opens, and also to limit stall prevention for instances where the vehicle 10 is stopping such as in panic stop situations or when approaching slower vehicles. Actuation of the foot brake allows for a stall true condition indicated at 51 to be set.

Figure 4:
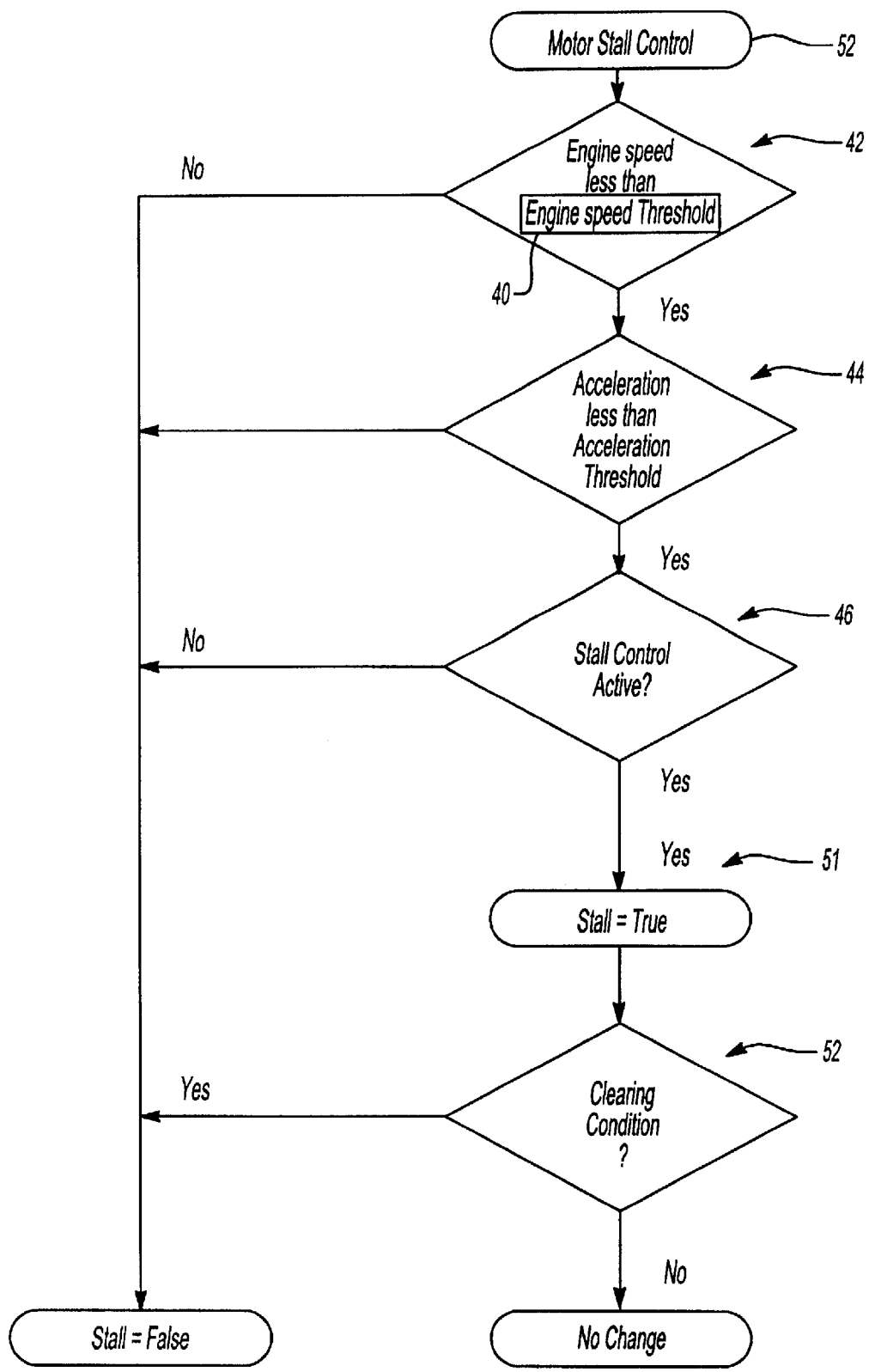
FIG. 4 is a flow chart of another embodiment of controlling an automated clutch, not including brake actuation.

Referring to FIG. 4, another embodiment of the invention is shown where foot brake 50 actuation is not required. In such circumstances, conditions indicative of engine stall will cause the clutch 16 to open regardless of foot brake 50 position. As appreciated, the ability of tailoring the conditions that will trigger the controller 28 to open the clutch 16 allow this system to be included in motor vehicles with differing configurations.

The controller 28 proportionally opens the clutch 16 in response to engine speed such that the friction plate 18 is allowed to slip relative to the flywheel 20 to prevent engine stall. The controller maintains proportional clutch 16 opening until a clearing condition, indicated at 52, is detected.

Figure 5:
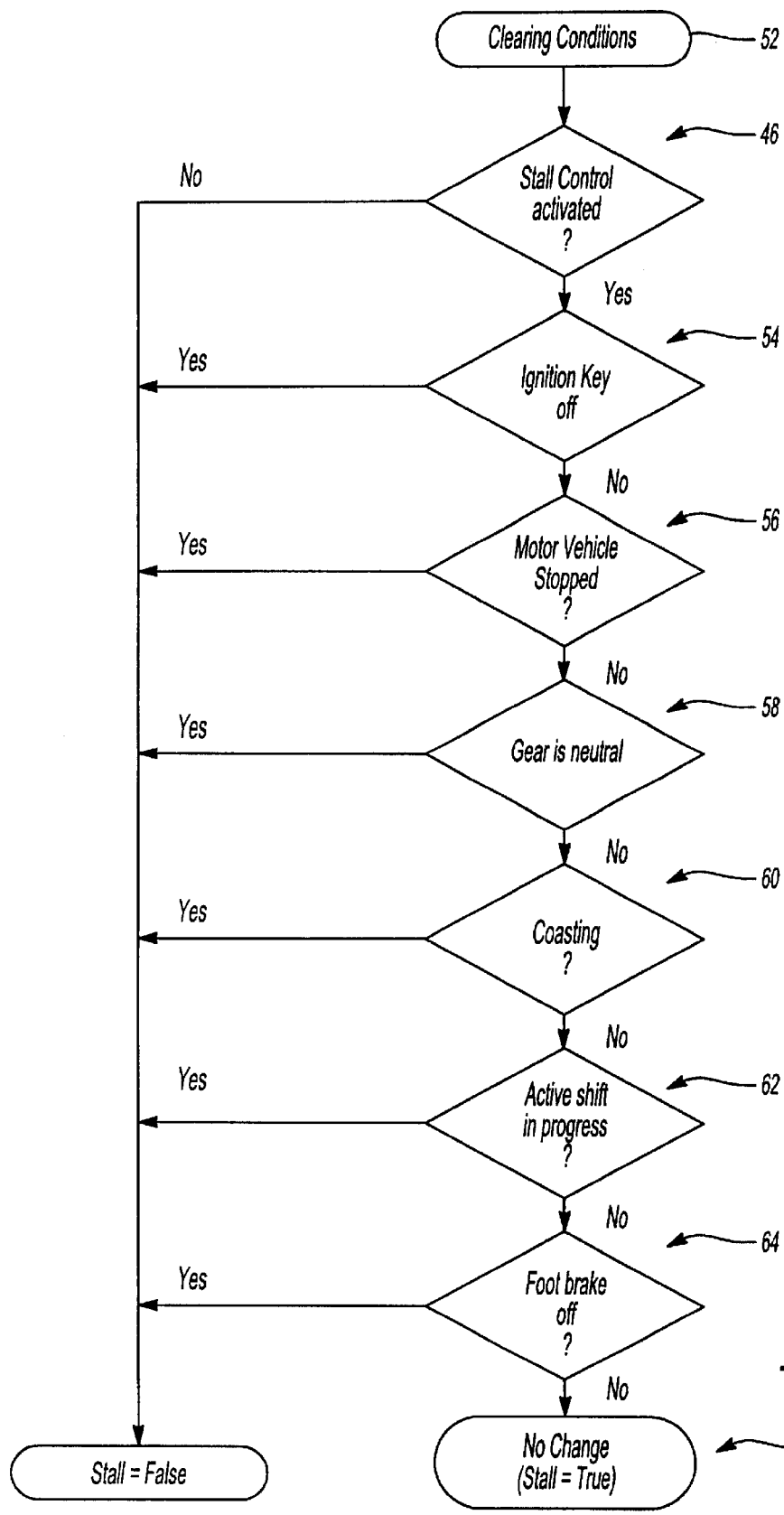
FIG. 5 is a flow chart of clearing conditions that reset a stall condition.

Referring to FIG. 5, the clearing conditions 52 are conditions of the vehicle 10 that indicate that engine stall should be allowed, or that engine stall has been prevented by actions other than engine stall control. The clearing conditions 52 includes detection of ignition key position, indicated at 54, where once the key is turned to an off position the stall true condition 54 is cleared.

Absence of accelerator pedal 32 actuation causes the controller 28 to detect a coasting condition, indicated at 60 that will proportionally open the clutch 16 according to coasting conditions discussed above and clear the stall true condition 51. This reengages the coasting condition such that the controller 28 opens the clutch 16 to accommodate coasting of the motor vehicle 10.

A shift to neutral indicated at 58 eliminates the load on the engine 12 and therefore prevents stalling and clears the stall true condition 51. Another clearing condition includes bringing the vehicle 10 to a standstill 56. As appreciated, if the motor vehicle 10 is standing still, only a few conditions can exist. Either the transmission 14 is in a neutral gear, or the engine 12 has stopped running. Either condition will clear the stall true condition 51. Indication of a shift in progress as indicated at 62, will clear the stall true condition 54 because the change in gear is a corrective action taken to prevent the engine from stalling.

Figure 6:
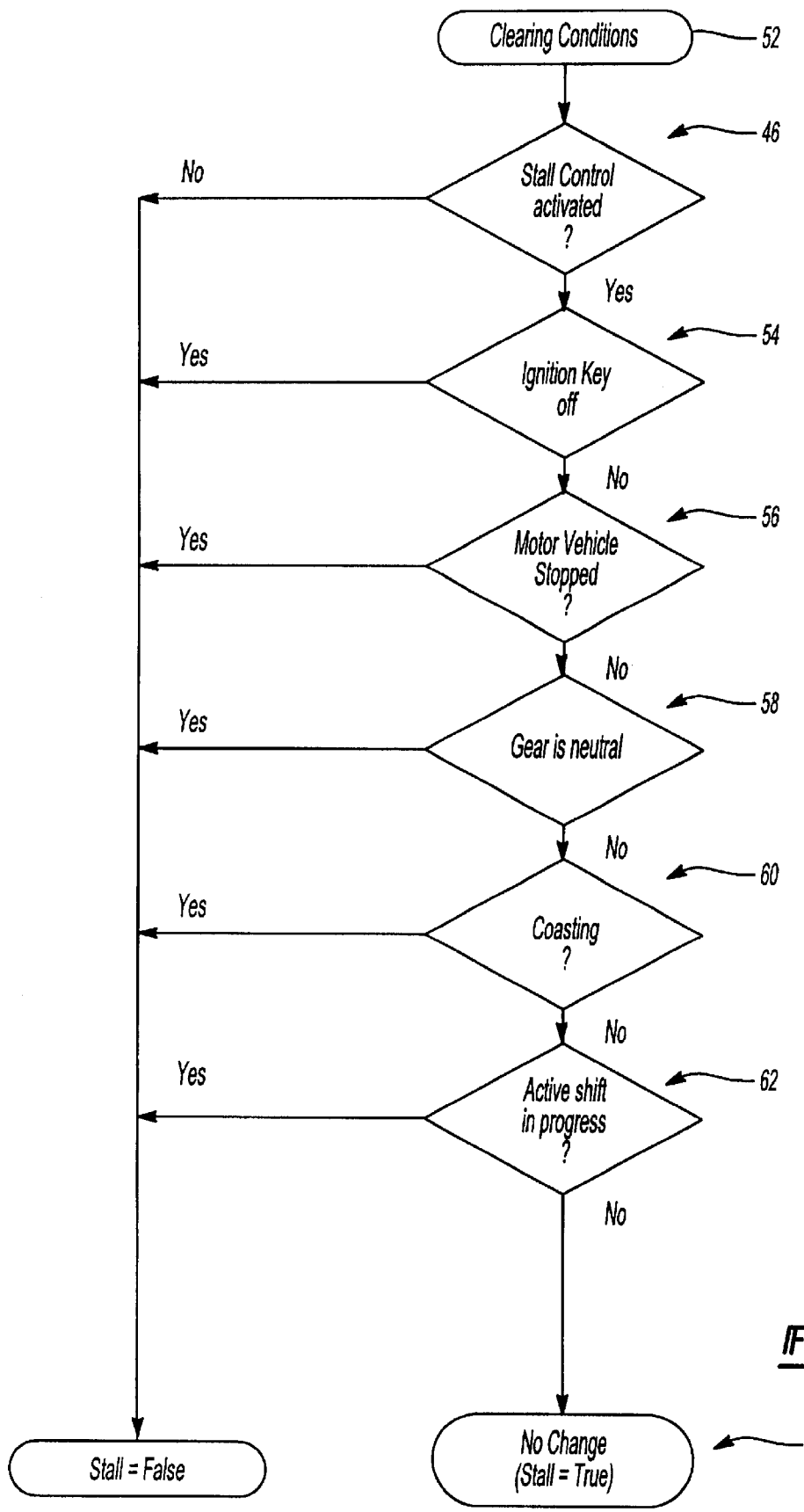
FIG. 6 is a flow chart of clearing conditions that reset a stall condition, not including foot brake actuation.

The absence of foot brake actuation 50 as indicated at 64 clears the stall true condition 54. As appreciated, the foot brake 50 includes several modes that determine when actuation of the foot brake 50 is a clearing condition. The stall true condition 51 clears when the brake is released in this embodiment indicating that the motor vehicle 10 will be able to move without being inhibited by the brake. Referring to FIG. 6, another embodiment of the clearing conditions 52 does not include absence of foot brake 50 actuation as a clearing condition 52.

In operation, the controller 28 continually monitors engine speed and updates the engine speed threshold based on current motor vehicle 10 conditions. If the engine speed drops below the engine speed threshold 40, the acceleration is checked as indicated at 46 and compared to the acceleration threshold. Once both the engine speed check 42 and the acceleration check are indicative of engine stall conditions, and the foot brake check 48 indicates that the foot brake 50 is properly actuated according to the specific configuration, the controller 28 actuates the automatic clutch 16 to selectively decouple the engine 12 from the transmission 14 and prevent engine stall. The controller 28 continues to proportionally open the clutch 16 until one of the clearing conditions is detected such that the controller 28 resumes normal operation of the automatic clutch 16.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of controlling an automated clutch of a motor vehicle to prevent engine stall, said method comprising the steps of;
    a. detecting actuation of a throttle control pedal;
    b. determining an engine stall threshold;
    c. detecting current engine speed;
    d. comparing current engine speed to said engine stall threshold;
    e. actuating said clutch to prevent the engine from stalling when the throttle control pedal is actuated and said current engine speed is below said engine stall threshold speed.

2. The method of claim 1, further including the step of detecting motor vehicle acceleration and comparing the motor vehicle acceleration to a threshold acceleration such that said clutch is actuated only when said motor vehicle acceleration is below said threshold acceleration.

3. The method of claim 1, further including the step of detecting engagement of the foot brake and actuating said clutch in response to said foot brake actuation.

4. The method of claim 1, wherein said step e. is further defined by said clutch proportionally decoupling the engine with the transmission to prevent engine stall.

5. The method of claim 4, wherein said step e. further includes the step of setting a true condition such that said clutch remains in a proportionally decoupled state until a clearing condition is detected.

6. The method of claim 5, wherein said clearing condition is further defined as including vehicle operating conditions indicative of conditions where said automated clutch is not to be actuated.

7. The method of claim 6, wherein said clearing condition is further defined as a position of an ignition key.

8. The method of claim 6, wherein said clearing condition includes the vehicle standing still.

9. The method of claim 6, wherein said clearing condition includes detecting said transmission in a neutral gear.

10. The method of claim 6, wherein said clearing condition includes coasting of the motor vehicle.

11. The method of claim 6, wherein said clearing condition includes detecting a gear shift in progress.

12. A system for prevention engine stall in a motor vehicle comprising:
    an automated clutch system selectively engagable to transmit power from an engine of the motor vehicle to a transmission of the motor vehicle; and
    a control system to actuate said automated clutch system in response to detection of actuation of an accelerator pedal and conditions indicative of engine stall, wherein said conditions indicative of engine stall are determined by determining an engine speed threshold based on current operating conditions, and comparing current speed to said engine speed threshold such that said control system actuates said automated clutch in response to a relationship between said engine speed and said engine speed threshold.

13. The system of claim 12, wherein said control system actuates said automated clutch in response to engagement of a foot brake.

14. The system of claim 13, wherein said control system sets a true condition upon actuation of said automated clutch such that said clutch remains actuated to decouple said engine with said transmission until a clearing condition is detected.

* * * * *